US010037356B2

(12) United States Patent
Cradick et al.

(10) Patent No.: US 10,037,356 B2
(45) Date of Patent: Jul. 31, 2018

(54) PLACEMENT OF SERVICES IN STREAM COMPUTING APPLICATIONS

(71) Applicant: International Business Machines Corporation, Armonk, NY (US)

(72) Inventors: Ryan K. Cradick, Oronoco, MN (US); Jason A. Nikolai, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 512 days.

(21) Appl. No.: 14/841,745

(22) Filed: Sep. 1, 2015

(65) Prior Publication Data
US 2017/0060959 A1   Mar. 2, 2017

(51) Int. Cl.
*G06F 17/30*   (2006.01)

(52) U.S. Cl.
CPC .............. *G06F 17/30516* (2013.01)

(58) Field of Classification Search
None
See application file for complete search history.

(56) References Cited

U.S. PATENT DOCUMENTS

| 7,613,848 | B2 | 11/2009 | Amini et al. |
| 8,732,300 | B2 | 5/2014 | Barsness et al. |
| 2012/0179809 | A1* | 7/2012 | Barsness ........... G06F 17/30516 709/224 |
| 2012/0218268 | A1 | 8/2012 | Accola et al. |
| 2014/0095503 | A1 | 4/2014 | Branson et al. |

OTHER PUBLICATIONS

Cradick et al., "Placement of Services in Stream Computing Applications," U.S. Appl. No. 15/593,762, filed May 12, 2017.
List of IBM Patents or Patent Applications Treated as Related, May 11, 2017, 2 pgs.
Ballard et al., "IBM InfoSphere Streams: Harnessing Data in Motion," Sep. 2010, 360 pages, IBM Redbooks, http://www.redbooks.ibm.com/abstracts/sg247865.html.

* cited by examiner

*Primary Examiner* — Anh Tai Tran
(74) *Attorney, Agent, or Firm* — Jared L. Montanaro

(57) ABSTRACT

A stream of tuples to be processed by a plurality processing elements executing on two or more compute nodes is received. Each compute node stores one or more of the processing elements having one or more stream operators. It is determined whether an overhead parameter associated with a first streams service located at a first stream operator is outside of a first overhead criterion. The first streams service is ended at the first stream operator and a second streams service is instantiated at a second stream operator when the overhead parameter associated with the first streams service is outside of the first overhead criterion. The second stream operator is different from the first stream operator. The method may include determining whether the first streams service samples a first data attribute of tuples or measures performance.

9 Claims, 12 Drawing Sheets

PLACEMENT OF SERVICES IN STREAM COMPUTING APPLICATIONS

FIELD

This disclosure generally relates to stream computing, and in particular, to computing applications that receive streaming data and process the data as it is received using software components distributed on stream-connected hardware nodes.

BACKGROUND

Database systems are typically configured to separate the process of storing data from accessing, manipulating, or using data stored in a database. More specifically, database systems use a model in which data is first stored and indexed in a memory before subsequent querying and analysis. In general, database systems may not be well suited for performing real-time processing and analyzing streaming data. In particular, database systems may be unable to store, index, and analyze large amounts of streaming data efficiently or in real time.

SUMMARY

Embodiments of the disclosure provide a method, system, and computer program product for processing data. The method, system, and computer program product receive two or more tuples to be processed by a plurality of processing elements operating on one or more computer processors.

Various embodiments are directed to a computer-implemented method for processing streaming data. The method includes receiving a stream of tuples to be processed by a plurality processing elements executing on one or more compute nodes. Each compute node can have one or more processors and a memory to store one or more of the processing elements. Each processing element can include one or more stream operators. Each stream operator is connected to at least one other stream operator and the stream operators define an operator graph having one or more execution paths corresponding with one or more flows of tuples between the stream operators. The method also includes determining whether an overhead parameter associated with a first streams service located at a first stream operator is outside of a first overhead criterion. In response to determining that the overhead parameter associated with the first streams service is outside of the first overhead criterion, the method includes ending the first streams service at the first stream operator, and instantiating the first streams service at a second stream operator in the operator graph. The second stream operator is different from the first stream operator. In addition, in various embodiments, the method may include determining whether a performance parameter at the first stream operator is outside of a first performance criterion. Further, in various embodiments, the method may include determining that the first streams service samples a first data attribute of tuples, and determining whether the first streams service is movable. Moreover, in various embodiments, the method may include determining that the first streams service measures performance, and determining whether the first streams service is movable.

Various embodiments are directed to a system and computer program product.

BRIEF DESCRIPTION OF THE DRAWINGS

Like reference numbers and designations in the various drawings indicate like elements.

DETAILED DESCRIPTION

Figure 1:
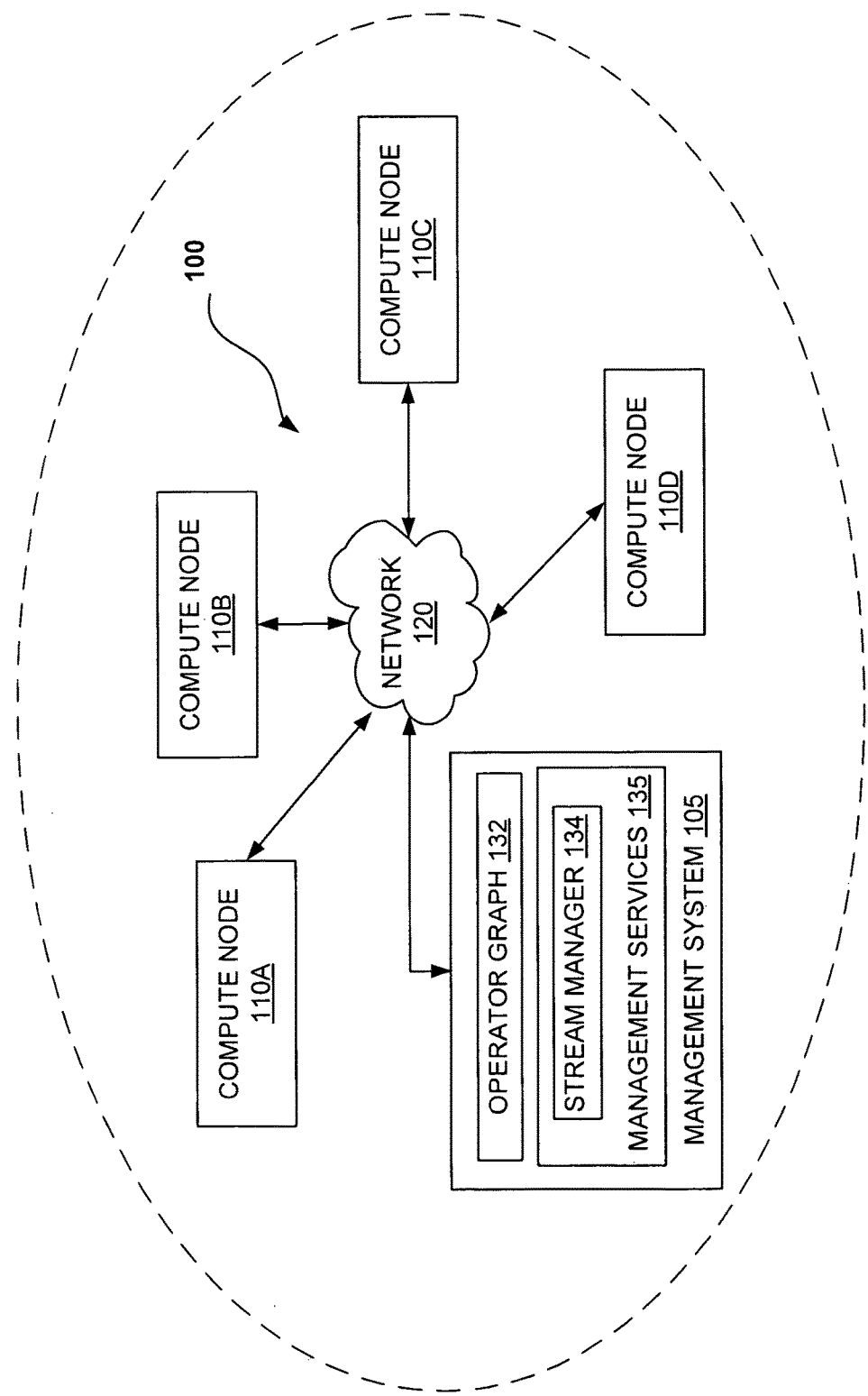
FIG. 1 illustrates a computing infrastructure configured to execute a stream computing application according to various embodiments.

Stream-based computing and stream-based database computing are emerging as a developing technology for database systems. Products are available which allow users to create applications that process and query streaming data before it reaches a database file. With this emerging technology, users can specify processing logic to apply to inbound data records while they are "in flight," with the results available in a very short amount of time, often in fractions of a second. Constructing an application using this type of processing has opened up a new programming paradigm that will allow for development of a broad variety of innovative applications, systems, and processes, as well as present new challenges for application programmers and database developers. While stream computing is suitable for many different types of applications, it is particularly suited for applications that require complex analytic operations to be performed in real time on large volumes of data received at a high rate.

Services can be provided for a stream computing application. For example, a service might be located at a streams operator to evaluate whether performance metrics at the operator are being met. In another example, a service might be located at a streams operator to sample data processed at the operator in order to validate the data by determining whether a particular attribute of tuples have values that fall within a particular range. A service may be designed so that it is tied to a particular location in an operator graph. While services are valuable, providing services requires resources. Services can slowdown an application or cause other performance issues, such as dropping some tuples without fully processing them. In addition, stream computing applications can operate in a dynamic environment where hardware resources may change, the amount of data being processed may change, and other environmental factors may influence the performance of the system. A service deployed a particular location may not slow down an application at a first time. However, the same service may contribute to a performance issue at a later time when some aspect of the environment changes.

As described below, stream operators are contained in processing elements. A service runs outside of the processing elements of a streams application. Processing elements run on compute nodes. A service may run on a different compute node than the compute node on which processing element is deployed. Alternatively, a service may run on the same compute node on which a processing element is deployed. In addition, a service may include more than one component: A first component can run on a different compute node than the node a processing element is deployed on and a second component can run on the same compute node on which a processing element is deployed.

According to various embodiments, an assessment is made to determine whether a streams computing application is not meeting a performance goal. This assessment includes determining whether a performance parameter at a first location in an operator graph is outside of a first performance criterion. If a performance goal is not being met, it is determined whether an overhead parameter associated with a first streams service at the first location is outside of a first overhead metric or criterion. Accordingly, various embodiments may include a component that monitors performance of a streams computing application and a component that monitors the impact that a particular service has on performance.

When it is determined that the overhead parameter associated with the first streams service is outside of the first overhead criterion, the first streams service at the first location in the operator graph may be ended. In addition, the first streams service may be "moved" to a second location in the operator graph. Moving a streams service away from a location in an operator graph where a performance criterion is not being met may help bring a streams computing application not meeting a performance goal back in line with the goal.

In some embodiments, a service is moved by instantiating the same service at a second location. In some embodiments, a service is moved by instantiating a similar service at two or more locations. In some embodiments, a first streams service being provided at two or more locations is ended and the service is moved by instantiating a "merged" service at fewer locations. For example, a first streams service being provided at two locations in an operator graph is replaced with a single service at one location. A service may be moved by adding or a new service to an existing service at the new location or by modifying the existing service at the new location.

In some embodiments, a first streams service samples data at a first location and it is determined that a modified version of the service sampling data at a second location is capable of generating the same data being sampled at the first location. In some embodiments, a first streams service samples data at a first location to achieve a particular objective and it is determined that a modified version of the service sampling data at a second location is capable of generating new data that achieves the same objective.

In some embodiments, a first streams service monitors a first performance parameter at a first location in the operator graph and it is determined that the same first performance parameter may be monitored at a second location. In some embodiments, a first streams service monitors a first performance parameter at a first location in the operator graph to achieve a particular objective. In addition, it is determined that there is a second performance parameter that may be monitored at a second location and the second performance metric achieves the same objective as the first performance metric.

In a stream computing application, stream operators are connected to one another such that data flows from one stream operator to the next (e.g., over a TCP/IP socket). When a stream operator receives data, it may perform operations, such as analysis logic, which may change the tuple by adding or subtracting attributes, or updating the values of existing attributes within the tuple. When the analysis logic is complete, a new tuple is then sent to the next stream operator. Scalability is achieved by distributing an application across nodes by creating executables (i.e., processing elements or PEs), as well as replicating processing elements on multiple nodes and load balancing among them. Stream operators in a stream computing application can be fused together to form a processing element that is executable. Doing so allows processing elements to share a common process space, resulting in much faster communication between stream operators than is available using inter-process communication techniques (e.g., using a TCP/IP socket). Further, processing elements can be inserted or removed dynamically from an operator graph representing the flow of data through the stream computing application. A particular stream operator may not reside within the same operating system process as other stream operators. In addition, stream operators in the same operator graph may be hosted on different nodes, e.g., on different compute nodes or on different cores of a compute node.

Data flows from one stream operator to another in the form of a "tuple." A tuple is a sequence of one or more attributes associated with an entity. Attributes may be any of a variety of different types, e.g., integer, float, Boolean, string, etc. An attribute may be data. The attributes may be ordered. In addition to attributes associated with an entity, a tuple may include metadata, i.e., data about the tuple. A tuple may be extended by adding one or more additional attributes or metadata to it. As used herein, "stream" or "data stream" refers to a sequence of tuples. Generally, a stream may be considered a pseudo-infinite sequence of tuples.

Tuples are received and output by stream operators and processing elements. An input tuple corresponding with a particular entity that is received by a stream operator or processing element, however, is generally not considered to be the same tuple that is output by the stream operator or processing element, even if the output tuple corresponds with the same entity or data as the input tuple. An output tuple need not be changed in some way from the input tuple.

Nonetheless, an output tuple may be changed in some way by a stream operator or processing element. An attribute or metadata may be added, deleted, or modified. For example, a tuple will often have two or more attributes. A stream operator or processing element may receive the tuple having multiple attributes and output a tuple corresponding with the input tuple. The stream operator or processing element may only change one of the attributes so that all of the attributes of the output tuple except one are the same as the attributes of the input tuple.

Generally, a particular tuple output by a stream operator or processing element may not be considered to be the same tuple as a corresponding input tuple even if the input tuple is not changed by the processing element. However, to simplify the present description and the claims, an output tuple that has the same data attributes or is associated with the same entity as a corresponding input tuple may be referred to herein as the same tuple unless the context or an express statement indicates otherwise. Some examples of stream operators that do not change the attributes of a tuple it receives include the split, sort, and union stream operators. Accordingly, a particular tuple output by a split, sort, or union stream operator may be referred to as the same tuple input to the operator.

FIG. 1 illustrates one exemplary computing infrastructure 100 that may be configured to execute a stream computing application, according to some embodiments. The computing infrastructure 100 includes a management system compute node 105 and two or more compute nodes 110A-110D—i.e., hosts—which are communicatively coupled to each other using one or more communications networks 120. The communications network 120 may include one or more servers, networks, or databases, and may use a particular communication protocol to transfer data (tuples) between the compute nodes 110A-110D, as well as to transfer monitoring data and commands for managing a streams application between the management system compute node 105 and the compute nodes 110A-110D.

The communications network 120 may include a variety of types of physical communication channels or "links." The links may be wired, wireless, optical, or any other suitable media. In addition, the communications network 120 may include a variety of network hardware and software for performing routing, switching, and other functions, such as routers, switches, or bridges. The communications network 120 may be dedicated for use by a stream computing application or shared with other applications and users. The communications network 120 may be any size. For example, the communications network 120 may include a single local area network or a wide area network spanning a large geographical area, such as the Internet. The links may provide different levels of bandwidth or capacity to transfer data at a particular rate. The bandwidth that a particular link provides may vary depending on a variety of factors, including the type of communication media and whether particular network hardware or software is functioning correctly or at full capacity. In addition, the bandwidth that a particular link provides to a stream computing application may vary if the link is shared with other applications and users. The available bandwidth may vary depending on the load placed on the link by the other applications and users. The bandwidth that a particular link provides may also vary depending on a temporal factor, such as time of day, day of week, day of month, or season.

Figure 2:
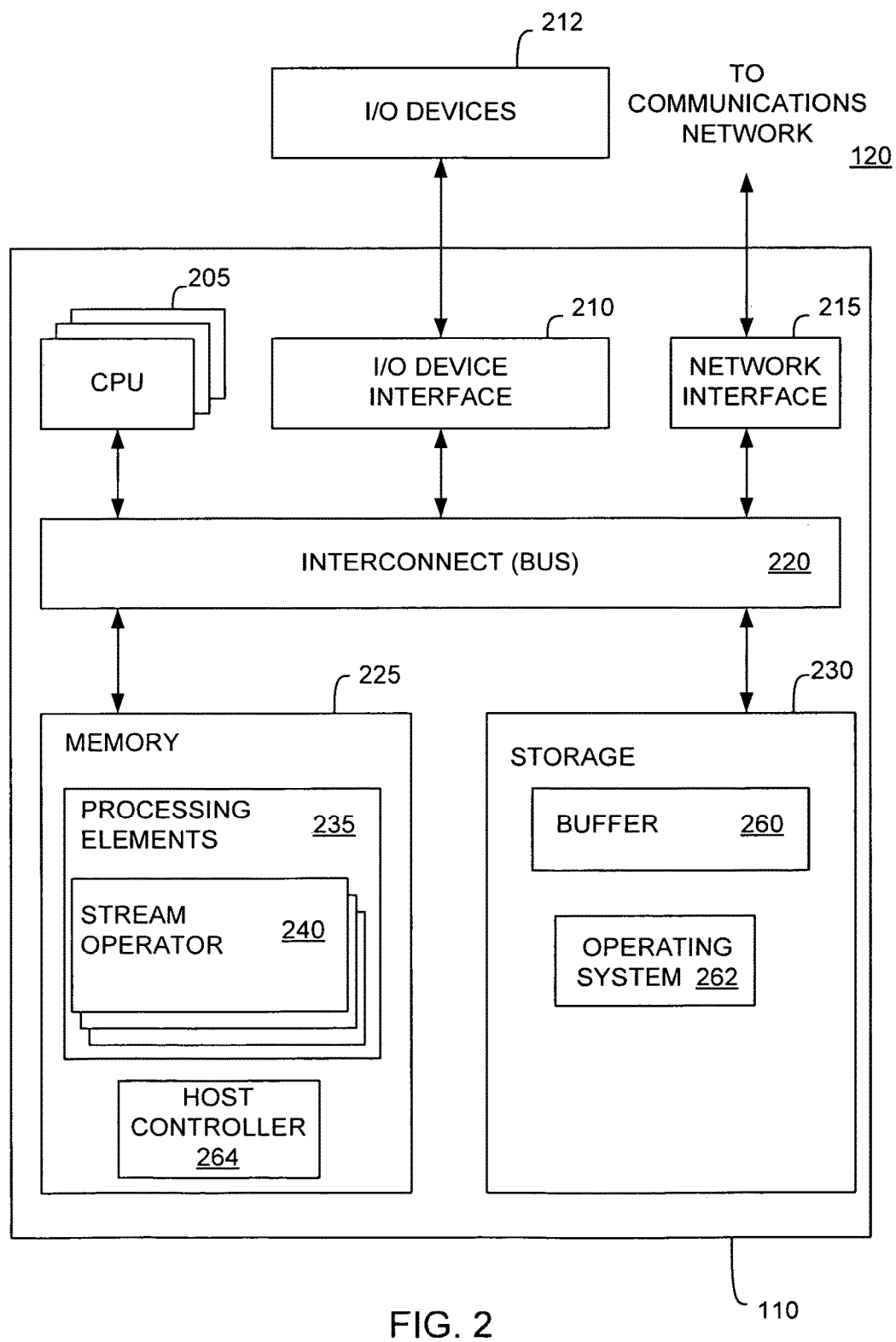
FIG. 2 illustrates a more detailed view of a compute node of FIG. 1 according to various embodiments.

FIG. 2 is a more detailed view of a compute node 110, which may be the same as one of the compute nodes 110A-110D of FIG. 1, according to various embodiments. The compute node 110 may include, without limitation, one or more processors (CPUs) 205, a network interface 215, an interconnect 220, a memory 225, and a storage 230. The compute node 110 may also include an I/O device interface 210 used to connect I/O devices 212, e.g., keyboard, display, and mouse devices, to the compute node 110.

Each CPU 205 retrieves and executes programming instructions stored in the memory 225 or storage 230. Similarly, the CPU 205 stores and retrieves application data residing in the memory 225. The interconnect 220 is used to transmit programming instructions and application data between each CPU 205, I/O device interface 210, storage 230, network interface 215, and memory 225. The interconnect 220 may be one or more busses. The CPUs 205 may be a single CPU, multiple CPUs, or a single CPU having multiple processing cores in various embodiments. In one embodiment, a processor 205 may be a digital signal processor (DSP). One or more processing elements 235 (described below) may be stored in the memory 225. A processing element 235 may include one or more stream operators 240 (described below). In one embodiment, a processing element 235 is assigned to be executed by only one CPU 205, although in other embodiments the stream operators 240 of a processing element 235 may include one or more threads that are executed on two or more CPUs 205. The memory 225 is generally included to be representative of a random access memory, e.g., Static Random Access Memory (SRAM) or Dynamic Random Access Memory (DRAM). The storage 230 is generally included to be representative of a non-volatile memory, such as a hard disk drive, solid state device (SSD), or removable memory cards, optical storage, flash memory devices, network attached storage (NAS), or connections to storage area network (SAN) devices, or other devices that may store non-volatile data. The network interface 215 is configured to transmit data via the communications network 120.

A stream computing application may include one or more stream operators 240 that may be compiled into a "processing element" container 235. The memory 225 may include two or more processing elements 235, each processing element having one or more stream operators 240. Each stream operator 240 may include a portion of code that processes tuples flowing into a processing element and outputs tuples to other stream operators 240 in the same processing element, in other processing elements, or in both the same and other processing elements in a stream computing application. Processing elements 235 may pass tuples to other processing elements that are on the same compute node 110 or on other compute nodes that are accessible via communications network 120. For example, a processing element 235 on compute node 110A may output tuples to a processing element 235 on compute node 110B.

The storage 230 may include a buffer 260. Although shown as being in storage, the buffer 260 may be located in the memory 225 of the compute node 110 or in a combination of both memories. Moreover, storage 230 may include storage space that is external to the compute node 110, such as in a cloud.

The compute node 110 may include one or more operating systems 262. An operating system 262 may be stored partially in memory 225 and partially in storage 230. Alternatively, an operating system may be stored entirely in memory 225 or entirely in storage 230. The operating system provides an interface between various hardware resources, including the CPU 205, and processing elements and other components of the stream computing application.

The compute node 110 may include a host controller 264. The host controller 264 may be stored partially in memory 225 and partially in storage 230. Alternatively, the host controller 264 may be stored entirely in memory 225 or entirely in storage 230. The host controller 264 is a streams service that generally runs on compute nodes on which one or more processing elements are deployed. The abbreviation "SVC" for services in the figures may refer to various services including services provided by a host controller 264. The host controller 264 carries out requests made by the stream manager 134. For example, the host controller 264 may start, stop, or monitor a processing element in response to a request from the stream manager 134. In some embodiments, the host controller 264 may include a component to collect performance data and metrics from processing elements executing on the node and from the compute node itself. In some embodiments, the host controller 264 may include a component to sample data processed by processing elements and analyze the sampled data to detect anomalies. In some embodiments, the host controller 264 may include a component to sample data processed by processing elements and to provide the sampled data to an external application.

Figure 3:
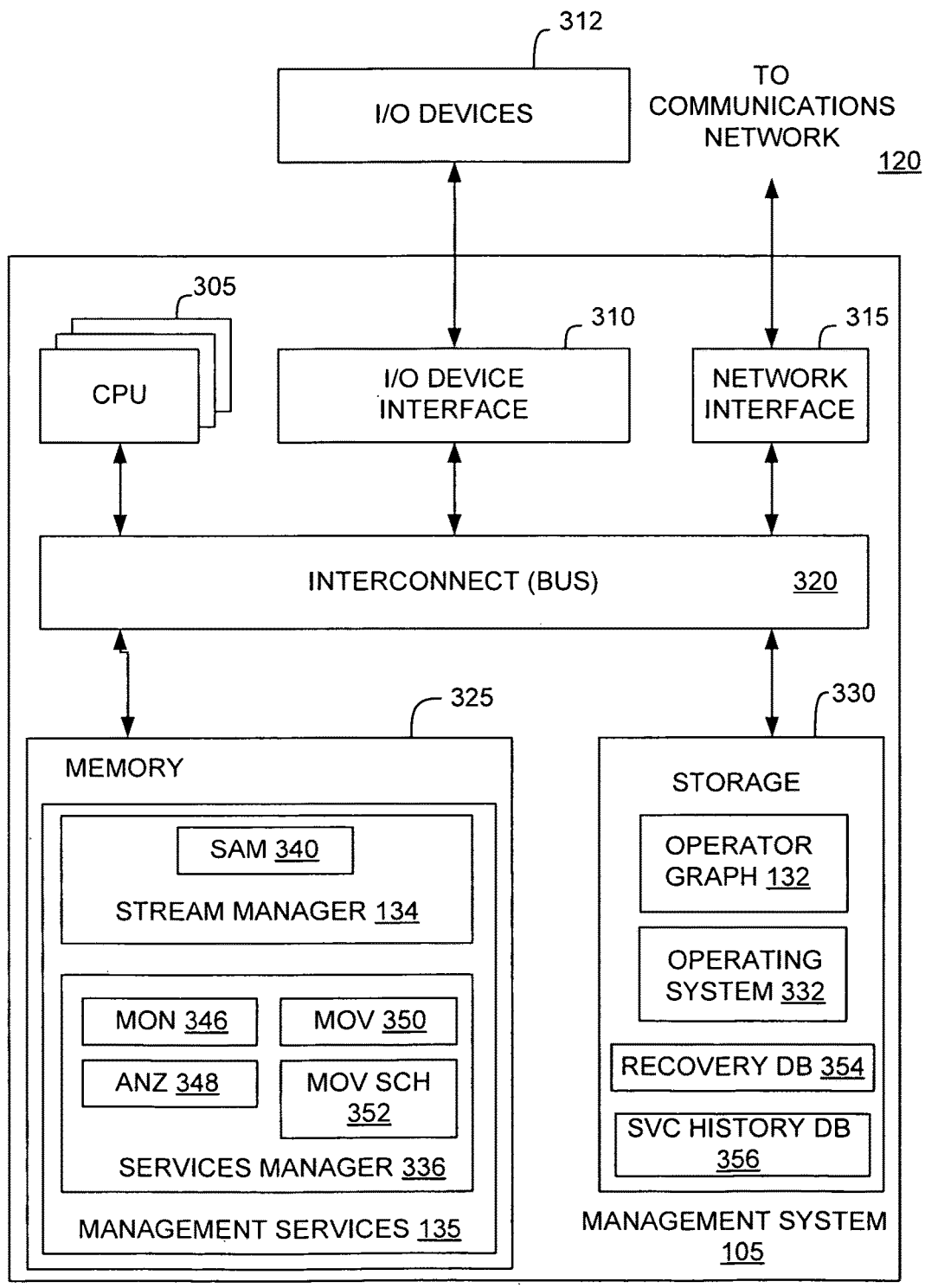
FIG. 3 illustrates a more detailed view of the management system of FIG. 1 according to various embodiments.

FIG. 3 is a more detailed view of the management system compute node 105 of FIG. 1 according to some embodiments. The management system compute node 105 may include, without limitation, one or more processors (CPUs) 305, a network interface 315, an interconnect 320, a memory 325, and a storage 330. The management system compute node 105 may also include an I/O device interface 310 connecting I/O devices 312, e.g., keyboard, display, and mouse devices, to the management system compute node 105.

Each CPU 305 retrieves and executes programming instructions stored in the memory 325 or storage 330. Similarly, each CPU 305 stores and retrieves application data residing in the memory 325 or storage 330. The interconnect 320 is used to move data, such as programming instructions and application data, between the CPU 305, I/O device interface 310, storage unit 330, network interface 315, and memory 325. The interconnect 320 may be one or more busses. The CPUs 305 may be a single CPU, multiple CPUs, or a single CPU having multiple processing cores in various embodiments. In one embodiment, a processor 305 may be a DSP. Memory 325 is generally included to be representative of a random access memory, e.g., SRAM or DRAM. The storage 330 is generally included to be representative of a non-volatile memory, such as a hard disk drive, solid state device (SSD), removable memory cards, optical storage, Flash memory devices, network attached storage (NAS), connections to storage area-network (SAN) devices, or the cloud. The network interface 315 is configured to transmit data via the communications network 120.

The memory 325 may store management services 135 that includes a stream manager 134 and a services manager 336. While the components and services are shown in FIG. 3 as being deployed on a single compute node (or host) 120, the components and services may be deployed on a two or more compute nodes. The stream manager 134 may include various management services, such as streams application manager (SAM) 340 and other components (not shown).

The SAM 340 is a management service that administers an instance of a stream computing applications.

The streams services manager 336 enables a service to be moved from one location in an operator graph to another. The services manager 336 may include various components, such as a monitoring component (MON) 346, an analyzing component (ANZ) 348, a mover component (MOV) 350, and a move scheduler (MOV SCH) 352.

The MON 346 collects runtime metrics on stream operators, processing elements, and streams services located on the compute nodes 110. The MON 346 may identify when performance issues are present or about to happen. In some embodiments, the MON 346 interacts with a component of the management system 105 that collects metrics on the stream computing application. In some embodiments, the MON 346 interacts with respective components running on the computes nodes 110. As one example, the MON 346 may interact with respective host controllers 264 running on the computes nodes 110. The MON 346 may analyze hardware CPU utilization or sample flow rates of data throughout the stream computing application. The MON 346 may analyze the performance of the system and compare it against the performance goals of the system, such as various performance criteria for stream operators, processing elements, and streams services. The goals can be defined at a variety of levels, e.g., at the application level, at the compute node level, at the processing element, or streams operator level.

The ANZ 348 interacts with the MON 346. Once a performance issue has been detected, the ANZ 348 determines which service or services could be moved to meet the performance objectives. To accomplish this, the ANZ 348 accesses metrics for each service and determines how one or more services may be impacting the performance of a streams operator, processing element or compute node. For example, a service may impact an operator in a variety of ways. The service might be sampling data out of the stream leading into the operator for analysis, the service may be running on the same node as the operator, or the service may be blocking data flowing to and from the operator for security reasons. Using this information, the ANZ 348 can identify one or more services that could be moved to help meet the performance goals. The ANZ 348 can also use historical information stored in a services history database 356 that describes past fluctuations in performance and the impact that moving particular services had on improving performance. Accordingly, the ANZ 348 may include a Learner module. As a streams computing application runs over time, certain patterns may emerge that can help predict and identify when services should or should not be moved and under what conditions. The Learner module can identify these patterns and services and store this information services history database 356 so that the information can be retrieved by the ANZ 348 to help in its determinations of which service or services could be moved. In addition, the Learner module can be used by the ANZ 348 to predict when performance issues are about to happen. For example, the Learner module may identify a pattern that indicates a large influx of data occurs on a regular basis at a certain time.

In various embodiments, the ANZ 348 includes a capability to identify that a first streams service samples data at a first location. The ANZ 348 may determine that a modified version of the service sampling data at a second location is capable of generating the same data being sampled at the first location. In some embodiments, the ANZ 348 includes a capability to identify that a first streams service samples data at a first location to achieve a particular objective. The ANZ 348 may determine that a modified version of the service sampling data at a second location is capable of generating data that achieves the same objective.

A first streams service may monitor a first performance parameter at a first location in the operator graph to achieve a particular objective. In some embodiments, the ANZ 348 includes a capability to determine that a second performance parameter may be monitored, i.e., is measurable, at a second location. The second performance parameter may be used in a predictor formula to determine the first performance parameter, which is measurable at the first location. In addition, the ANZ 348 may include a capability to determine that there is a second performance parameter that may be monitored at a second location and the second performance parameter may be used to achieve the same objective as the first performance parameter. Further, in various embodiments, the ANZ 348 identifies a second performance parameter measurable at a second stream operator and a third performance parameter measurable at a third stream operator. A predictor formula may be employed by the ANZ 348 to determine the first performance parameter measurable at a first location. The predictor formula may use the second and third performance parameters.

The MOV 350 is capable of determining whether one or more services is movable. In addition, the MOV 350 is capable of determining whether duplicating or merging services is necessary to match the coverage of the original service. For example, an operator may split data into two separate streams (a split operator). To match coverage of a service that sampled data upstream of a split operator, the service may need to be replaced with two services that sample the same data downstream from the split operator. The MOV 350 is capable of recognizing execution paths that do not modify a particular attribute of tuples flowing on the path. In addition, the MOV 350 is capable of recognizing that the particular attribute is sampled or used by a service at a location on the path. The MOV 350 uses this information that it recognizes about the path and the service to determine whether a service is movable. Continuing the example, the MOV 350 uses this information to determine that a service that checked tuples upstream from a split operator can now be moved downstream from the operator and duplicated on both streams. In some instances, the MOV 350 may determine that a service should be stopped or even started based on the performance goals.

The MOV SCH 352 schedules a move of the service to its new location once a service to be moved and its new location are identified. The MOV SCH 352 may use different factors in determining how and when to move a service. For example, a service that collects metrics for every 100 tuples may be scheduled to move after it reaches the next iteration of 100 tuples. Alternatively, the MOV SCH 352 may have the service running downstream (or upstream) prior to stopping the original service such that there is a complete coverage throughout the transitional period.

Additionally, the storage 330 may store an operator graph 132, a recovery database 354, and the services history database 356. The operator graph 132 may define how tuples are routed to processing elements 235 (FIG. 2) for processing. The recovery database 354 is a management service that enables the recovery of failed components.

The management system compute node 105 may include one or more operating systems 332. An operating system 332 may be stored partially in memory 325 and partially in storage 330. Alternatively, an operating system 132 may be stored entirely in memory 325 or entirely in storage 330. The operating system 132 provides an interface between various hardware resources, including the CPU 305, and processing elements and other components of the stream computing application.

Figure 4:
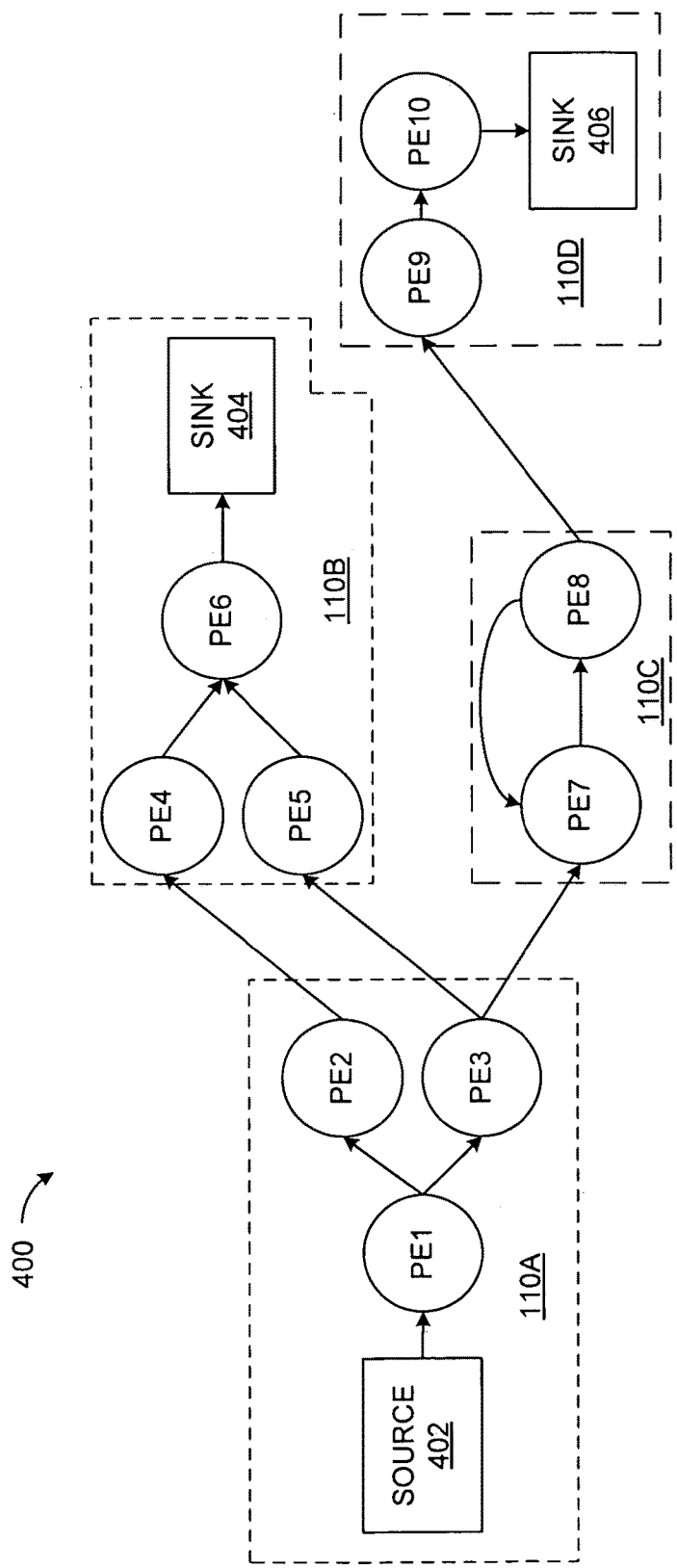
FIG. 4 illustrates an operator graph for a stream computing application according to various embodiments.

FIG. 4 illustrates an exemplary operator graph 400 for a stream computing application beginning from one or more sources 135 through to one or more sinks 404, 406, according to some embodiments. This flow from source to sink may also be generally referred to herein as an execution path. In addition, a flow from one processing element to another may be referred to as an execution path in various contexts. Although FIG. 4 is abstracted to show connected processing elements PE1-PE10, the operator graph 400 may include data flows between stream operators 240 (FIG. 2) within the same or different processing elements. Typically, processing elements, such as processing element 235 (FIG. 2), receive tuples from the stream as well as output tuples into the stream (except for a sink—where the stream terminates, or a source—where the stream begins). While the operator graph 400 includes a relatively small number of components, an operator graph may be much more complex and may include many individual operator graphs that may be statically or dynamically linked together.

Figure 5:
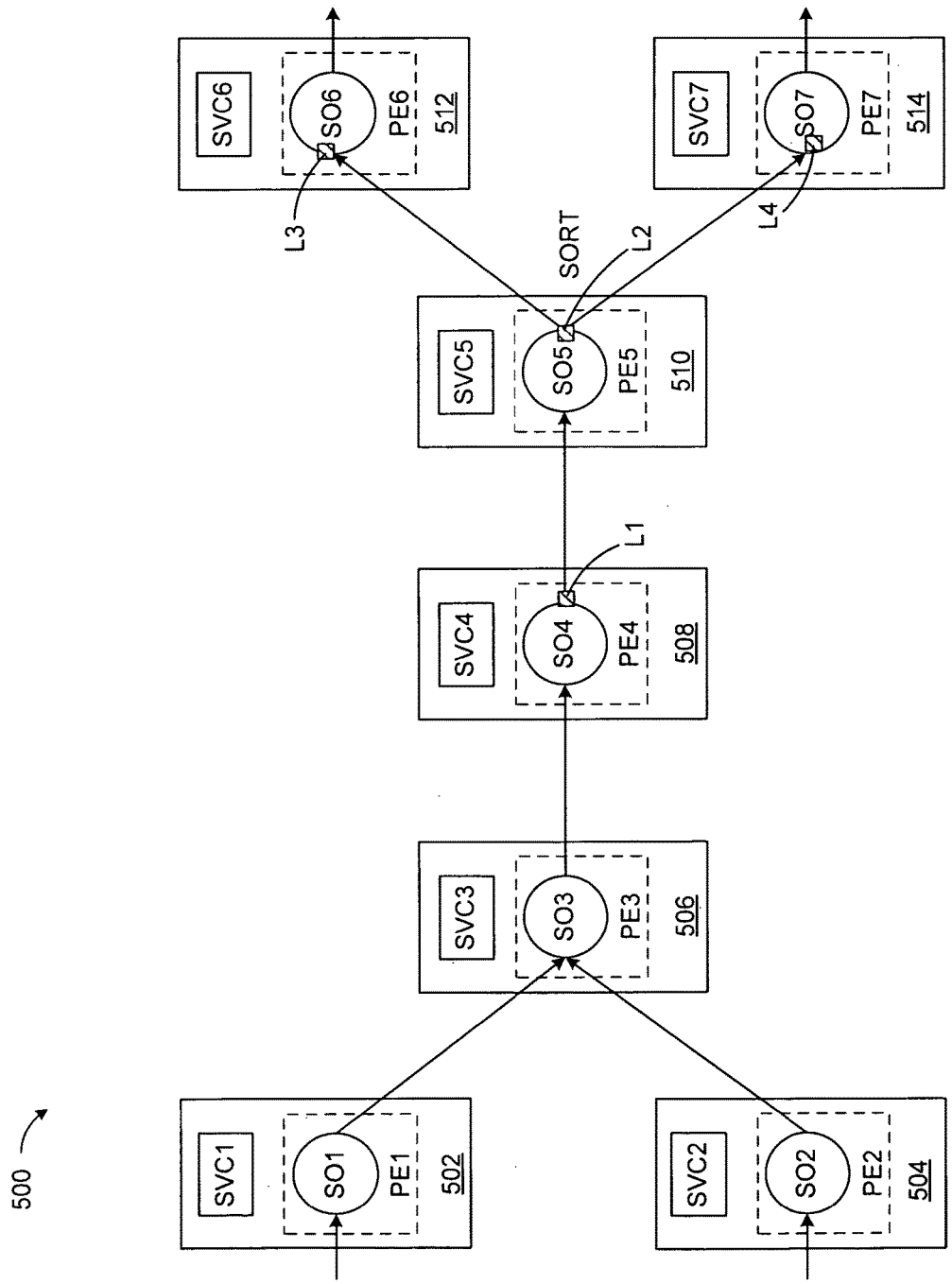
FIG. 5 illustrates a first example of an operator graph having an execution path that does not modify a particular attribute of tuples flowing on the path, the path connecting a first location where a first service samples the attribute and a second location where a second service is capable of sampling the same attribute according to various embodiments.

The example operator graph shown in FIG. 5 includes ten processing elements (labeled as PE1-PE10) running on the compute nodes 110A-110D. A processing element may include one or more stream operators fused together to form an independently running process with its own process ID (PID) and memory space. In cases where two (or more) processing elements are running independently, inter-process communication may occur using a "transport," e.g., a network socket, a TCP/IP socket, or shared memory. Inter-process communication paths used for inter-process communications can be a critical resource in a stream computing application. However, when stream operators are fused together, the fused stream operators can use more rapid communication techniques for passing tuples among stream operators in each processing element.

The operator graph 400 begins at a source 135 and ends at a sink 404, 406. Compute node 110A includes the processing elements PE1, PE2, and PE3. Source 135 flows into the processing element PE1, which in turn outputs tuples that are received by PE2 and PE3. For example, PE1 may split data attributes received in a tuple and pass some data attributes in a new tuple to PE2, while passing other data attributes in another new tuple to PE3. As a second example, PE1 may pass some received tuples to PE2 while passing other tuples to PE3. Tuples that flow to PE2 are processed by the stream operators contained in PE2, and the resulting tuples are then output to PE4 on compute node 110B. Likewise, the tuples output by PE4 flow to operator sink PE6 404. Similarly, tuples flowing from PE3 to PE5 also reach the operators in sink PE6 404. Thus, in addition to being a sink for this example operator graph, PE6 could be configured to perform a join operation, combining tuples received from PE4 and PE5. This example operator graph also shows tuples flowing from PE3 to PE7 on compute node 110C, which itself shows tuples flowing to PE8 and looping back to PE7. Tuples output from PE8 flow to PE9 on compute node 110D, which in turn outputs tuples to be processed by operators in a sink processing element, for example PE10 506.

Processing elements 235 (FIG. 2) may be configured to receive or output tuples in various formats, e.g., the processing elements or stream operators could exchange data marked up as a JSON document, an XML document, or a document in another format. Furthermore, each stream operator 240 within a processing element 235 may be configured to carry out any form of data processing functions on received tuples, including, for example, writing to database tables or performing other database operations such as data joins, splits, reads, etc., as well as performing other data analytic functions or operations.

The stream manager 134 of FIG. 1 may be configured to monitor a stream computing application running on compute nodes, e.g., compute nodes 110A-110D, as well as to change the deployment of an operator graph, e.g., operator graph 132. The stream manager 134 may move processing elements from one compute node 110 to another, for example, to manage the processing loads of the compute nodes 110A-110D in the computing infrastructure 100. Further, stream manager 134 may control the stream computing application by inserting, removing, fusing, un-fusing, or otherwise modifying the processing elements and stream operators (or what tuples flow to the processing elements) running on the compute nodes 110A-110D.

Because a processing element may be a collection of fused stream operators, it is equally correct to describe the operator graph as one or more execution paths between specific stream operators, which may include execution paths to different stream operators within the same processing element. FIG. 4 illustrates execution paths between processing elements for the sake of clarity.

FIGS. 5-9 illustrate examples of portions of an operator graph for a stream-based computing application shown at the stream operator level. Each example operator graph portion shown in FIGS. 5-9 includes multiple compute nodes. Each of the compute nodes includes a single processing element and each processing element includes a single stream operator. It should be appreciated that the compute nodes in these figures may include multiple processing elements. In addition, it should be appreciated that the processing elements in these figures may include multiple stream operators. In addition, each compute node shown in FIGS. 5-9 includes one or more services running on the respective node. Moreover, while the example operator graph portions of FIGS. 5-9 include a relatively small number of components, an operator graph may be much more complex and may include many individual operator graphs that may be statically or dynamically linked together. FIGS. 5-9 are presented showing single instances of processing elements and stream operators, and a relatively small operator graph, in order to not obscure various aspects of the disclosed embodiments.

FIG. 5 is an example of a portion of an operator graph for a stream-based computing application. The operator graph portion 500 shown in FIG. 5 includes stream operators SO1 to SO7, which are included in respective processing elements PE1 to PE7. The processing elements PE1 to PE7 are deployed on respective compute nodes 502 to 514. The compute nodes 502 to 514 each include one or more services (SVC1 to SVC7) running on the respective nodes. While operator graph portion 500 includes stream operators designated SO1 to SO7, these stream operators SO1 to SO7 may be configured to perform the same or different operations as like designated stream operators in other figures.

FIG. 5 illustrates a first example of an operator graph having an execution path that does not modify a particular attribute of tuples flowing on the path according to various embodiments. This execution path includes a first location L1 where a first service SCV4 samples the attribute and a second location L2 (or alternatively, second locations L3 and L4) where a second service SVC5 (or alternatively, second services SVC6 AND SVC7) is capable of sampling the same attribute.

In FIG. 5, a service SVC4 is located on compute node 508. The service SVC4 samples data at location L1 in an operator graph, i.e., SVC4 samples a particular attribute of tuples output from stream operator SO4. For example, the service SVC4 may evaluate the sampled attribute of tuples at location L1 to detect anomalies. Stream operator SO5 is located in processing element PE5 on compute node 510. In this example, stream operator SO5 performs a sort operation. For example, tuples may include first attribute $a_1$ and a second attribute $a_2$. Stream operator SO5 may a sort tuples having a value of $a_2$ greater than 1,000 to stream operator S06 on compute node 512 and tuples having a value of $a_2$ less than or equal to 1,000 to stream operator SO7 on compute node 514. Stream operator SO5 does not change the values of the first attribute $a_1$ or the second attribute $a_2$.

In various embodiments, it may be determined that an overhead parameter associated with the streams service SVC4 is outside, e.g., exceeds, an overhead metric or criterion. In addition, it may be determined whether the streams service SVC4 is movable to another location in the operator graph. As one example, it may be determined that a first execution path that includes the output of stream operator SO4 (L1) and the output of SO5 (L2) does not modify the first attribute $a_1$ of tuples flowing on the first execution path. Because this execution path does not change the value of the first attribute $a_1$, the streams service SVC4 may be moved to compute node 510 to sample the output of SO5. The moved service may be included in SVC5. As a second example, it may be determined that a first execution path that includes the output of stream operator SO4 (L1) and the inputs of SO6 (L3) and SO7 (L4) does not modify the first attribute $a_1$ of tuples flowing on the first execution path. Because this execution path does not change the value of the first attribute $a_1$, the streams service SVC4 may be moved to compute nodes 512 and 514 to sample the output of SO5. The moved service may be included in two services: SVC6 and SVC7.

Figure 6:
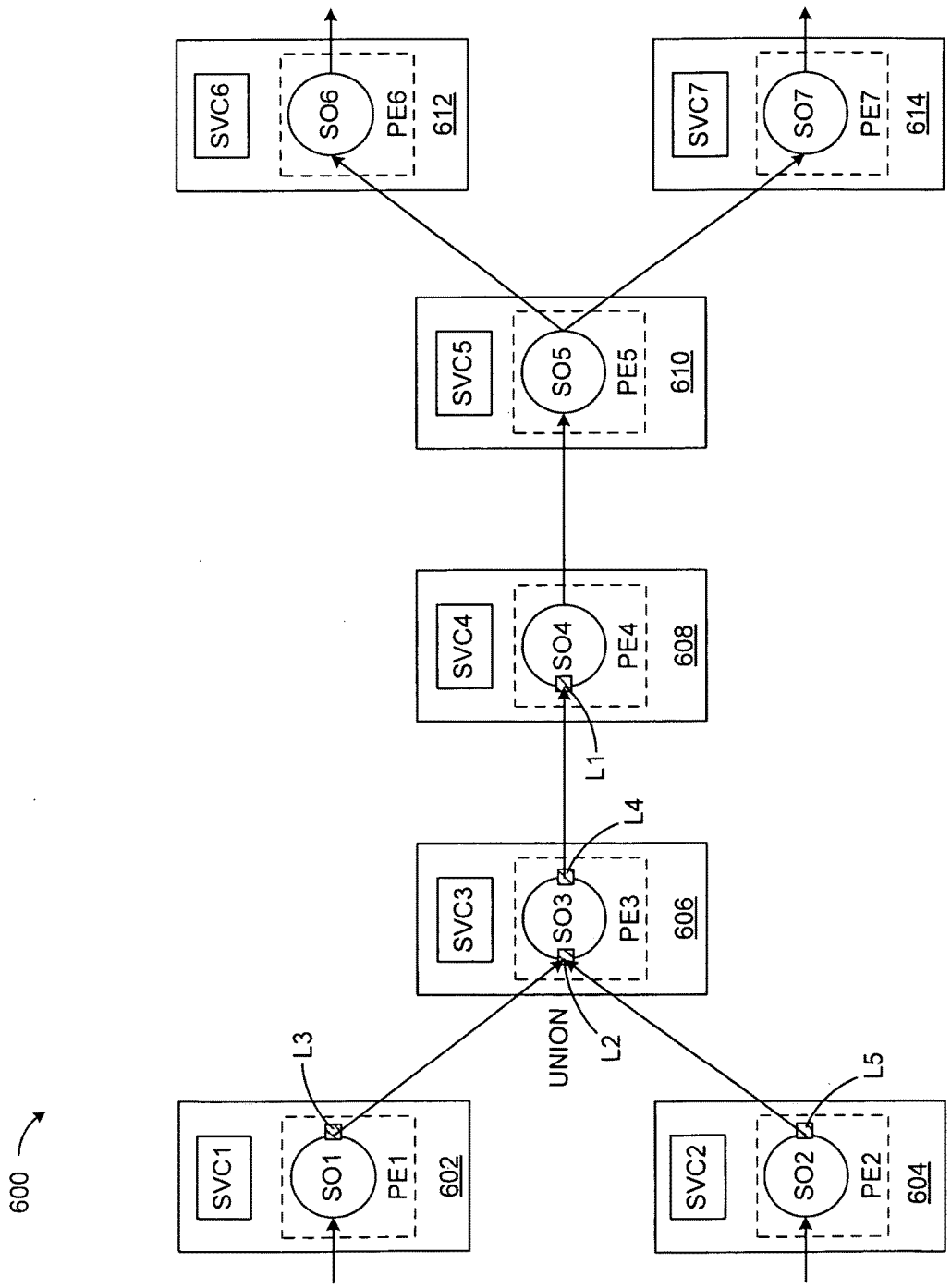
FIG. 6 illustrates a second example of an operator graph having an execution path that does not modify a particular attribute of tuples flowing on the path, the path connecting a first location where a first service samples the attribute and a second location where a second service is capable of sampling the same attribute according to various embodiments.

FIG. 6 is an example of a portion of an operator graph for a stream-based computing application shown. The operator graph 600 includes stream operators SO1 to SO7, which are included in respective processing elements PE1 to PE7. The processing elements PE1 to PE7 are deployed on respective compute nodes 602 to 614. The compute nodes 602 to 614 each include one or more services (SVC1 to SVC7) running on the respective nodes. While operator graph portion 600 includes stream operators designated SO1 to SO7, these stream operators SO1 to SO7 may be configured to perform the same or different operations as like designated stream operators in other figures.

FIG. 6 illustrates a second example of an operator graph having an execution path that does not modify a particular attribute of tuples flowing on the path according to various embodiments. In this second example, the execution path includes a first location L1 where a first service SVC 4 samples the attribute and a second location L2 where a second service SVC 3 is capable of sampling the same attribute. Alternatively, a second service SVC3 is capable of sampling the same attribute at a second location L4. In yet another alternative, a second service SVC1 is capable of sampling the same attribute at the second location L3.

In FIG. 6, a service SVC4 is located on compute node 608. The service SVC4 samples data at location L1 in an operator graph, i.e., SVC4 samples a particular attribute first attribute $a_1$ of tuples input to stream operator SO4. For example, the service SVC4 may evaluate a sampled first attribute $a_1$ of tuples at location L1 to detect anomalies.

Stream operator SO3 is located in processing element PE3 on compute node 606. In this example, stream operator SO3 performs a union operation. Stream operator SO3 includes two input ports and one output port. Stream operator SO3 receives a first input stream from stream operator SO1 on a first input port and second input stream from stream operator SO2 on a second input port. The union operator merges the stream of tuples received from SO1 with the stream of tuples received from SO2. Stream operator SO3 outputs a single stream of tuples that includes all of the tuples received from SO1 and SO2. Stream operator SO3 does not change the values of the attributes of tuples received in either stream.

In various embodiments, it may be determined that an overhead parameter associated with the streams service SVC4 is outside, e.g., exceeds, an overhead metric or criterion. In addition, it may be determined whether the streams service SVC4 is movable to another location in the operator graph. As one example, it may be determined that a "first execution path" that includes the input to stream operator SO4 (L1) and the input to SO3 (L2) does not modify the first attribute $a_1$ of tuples flowing on the first execution path. Because this execution path does not change the value of the first attribute $a_1$, the streams service SVC4 may be moved to compute node 606 to sample the input of SO3. The moved service may be included in SVC3. In particular, the first attribute $a_1$ may be included in the first and second input streams received from SO1 and SO2. SVC3 may sample attributes $a_1$ of tuples received on the first and second ports of SO3. As a second example, the first execution path may be determined to be a path that includes the input of stream operator SO4 (L1) and the output of SO3 (L4). Like the first example, the streams service SVC4 may be moved to compute node 606, but instead the first attribute $a_1$ is sampled from the output of SO3.

As a third example, it may be determined that the first execution path is a path that includes the input of stream operator SO4 (L1) and the outputs of SO1 (L3) and SO2 (L5). Because stream operator SO3 does not modify the first attribute $a_1$ of tuples flowing on this execution path, the streams service SVC4 may be moved to compute nodes 602 and 604. The moved service may be included in the services SVC1 and SVC2.

Figure 7:
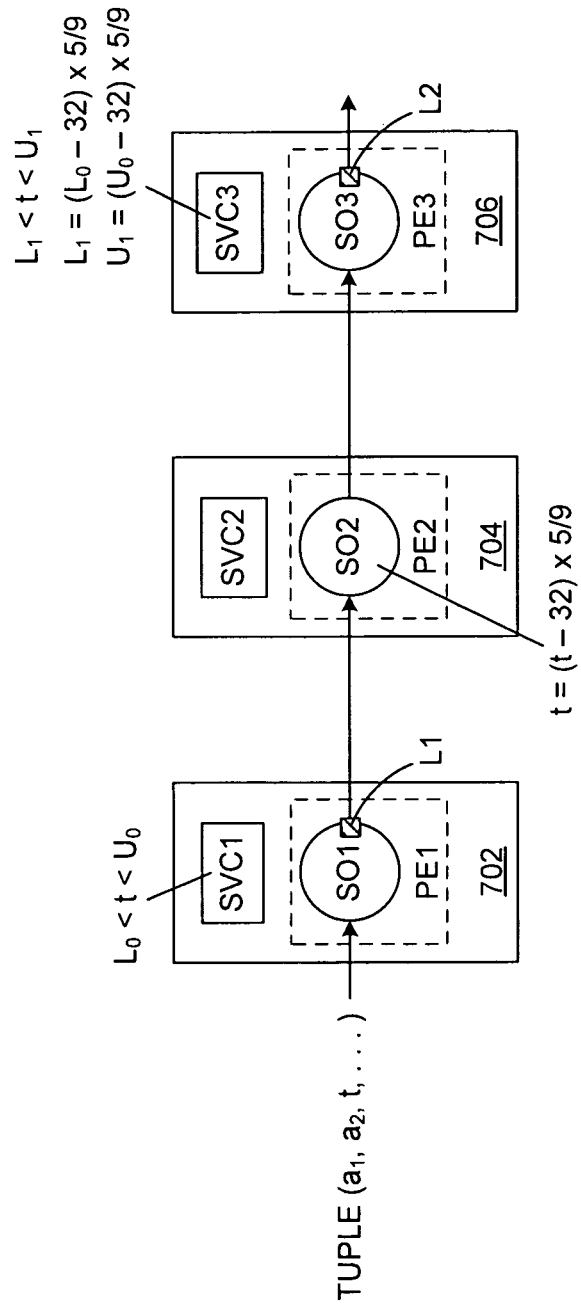
FIG. 7 illustrates an example of an operator graph having a first location where a first service is performed to generate a first result and a second location where a second service is performable to generate the first result according to various embodiments.

FIG. 7 is an example of a portion of an operator graph for a stream-based computing application. The operator graph portion 700 shown in FIG. 7 includes stream operators SO1 to SO3, which are included in respective processing elements PE1 to PE3. The processing elements PE1 to PE3 are deployed on respective compute nodes 702 to 706. The compute nodes 702 to 706 each include one or more services (SVC1 to SVC3) running on the respective nodes. While operator graph portion 700 includes stream operators designated SO1 to SO3, these stream operators SO1 to SO3 may be configured to perform the same or different operations as like designated stream operators in other figures.

FIG. 7 illustrates an example of an operator graph having a first location L1 where a first service SVC1 is performed to generate a first result and a second location L2 where a second service SVC3 is performable to generate the first result according to various embodiments. In the example of FIG. 7, the first service SVC1 samples a particular data attribute "t" of tuples output from stream operator SO1, e.g., at L1. The attribute t may be value of a temperature that is in Fahrenheit. The first service may determine whether the value of t for each tuple is within a particular range, e.g., $L_0 < t < U_0$. If a sampled value of attribute t is outside of the range, the SVC1 may identify the tuple as an anomaly. The stream operator SO2 converts the value of attribute t to the Celsius scale.

In various embodiments, it may be determined that an overhead parameter associated with the streams service SVC1 in FIG. 7 is outside, e.g., exceeds, an overhead metric or criterion. In addition, it may be determined whether the streams service SVC1 is movable to another location in the operator graph. In the example of FIG. 7, it may be determined that the SVC1 is movable to another location if the service is modified. As a first example, it is determined that the first streams service generates a first result. The first result in this example is whether t falls in the range $L_0 < t < U_0$. It may be determined whether a second operation is performable at a second location L2 to generate the first result based on an attribute sampled at location L1. If so, the service may be moved to the second location L2. As a first example, the output of stream operator SO3 may be the second location L2 and the service SVC3 may sample the attribute t of tuples output from SO3. The service SVC1 provided at L1 may be moved to location L2 and modified to convert samples of the attribute t from Celsius to Fahrenheit before determining whether the attribute t falls in the range $L_0 < t < U_0$. The modified service at L2 may be denoted or included in SVC3. As a second example, the service provided by SVC1 at location L1 may be modified to determine whether samples of the attribute t taken at L2, which are in Celsius, fall within a modified range of values, e.g., $L_1 < t < U_1$, where $L_1 = (L_0 - 32) \times 5/9$, and $U_1 = (U_0 - 32) \times 5/9$. The modified service at L2, which uses the modified range of values, may be denoted or included in SVC3.

Figure 8:
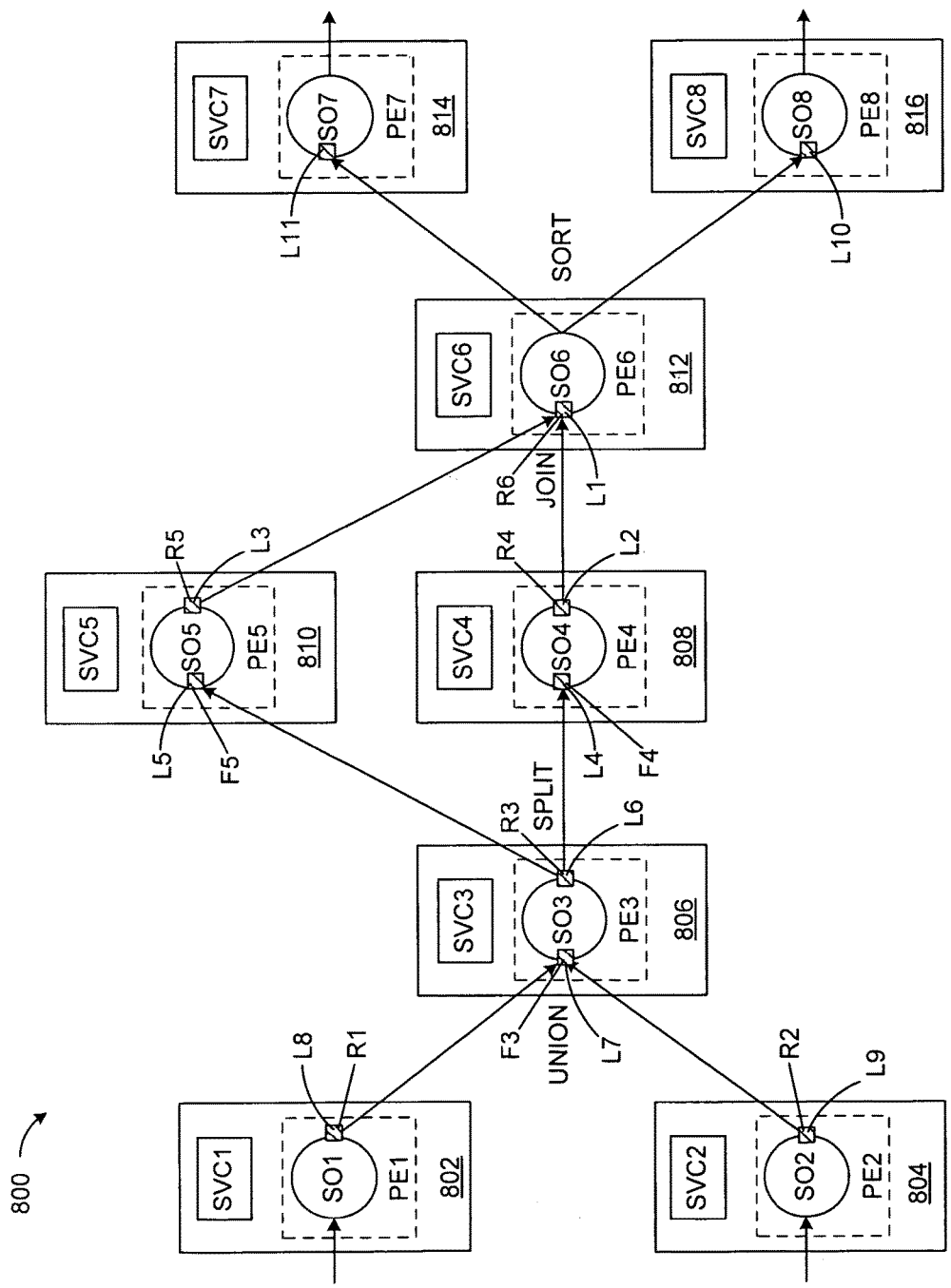
FIG. 8 illustrates an example of an operator graph having a first location where a first rate of flow of tuples is measured and various second locations where a second rate of flow of tuples can be measured to determine the first rate of flow according to various embodiments.

FIG. 8 is an example of a portion of an operator graph for a stream-based computing application. The operator graph portion 800 shown in FIG. 8 includes stream operators SO1 to SO8, which are included in respective processing elements PE1 to PE8. The processing elements PE1 to PE8 are deployed on respective compute nodes 802 to 816. The compute nodes 802 to 816 each include one or more services (SVC1 to SVC8) running on the respective nodes. While operator graph portion 800 includes stream operators designated SO1 to SO8, these stream operators SO1 to SO8 may be configured to perform the same or different operations as like designated stream operators in other figures.

FIG. 8 illustrates an example of an operator graph 800 having a first location where a first streams service measures performance and it can be determined that the first streams service is movable to various other locations in the operator graph. In particular, FIG. 8 illustrates an operator graph having a first location L1 where a first rate of flow of tuples is measured and various second locations where a second rate of flow of tuples can be measured, i.e., a second rate is measurable, to determine the first rate of flow according to various embodiments. In the example of FIG. 8, the stream operator SO6 performs a join operation. Stream operator SO6 includes two input ports and one output port. Stream operator SO6 receives a first input stream from stream operator SO4 on a first input port and second input stream from stream operator SO5 on a second input port. The service SV6 determines a first rate of flow of tuples R6 into the stream operator SO6.

In various embodiments, it may be determined that an overhead parameter associated with the streams service SVC6 in FIG. 8 is outside, e.g., exceeds, an overhead metric or criterion. In addition, it may be determined whether the streams service SVC6 is movable to another location in the operator graph. This determination of movability of the service SVC6 may include determining a predictor formula for predicting the performance values that the service SVC6 generates. If a predictor formula can be determined, the service SVC6 may be moved to one or more other locations. A first example of a predictor formula is R6=R4+R5, where R6 is the first rate of flow of tuples R6 into SO6, R4 is the rate of flow of tuples out of stream operator SO4 and R5 is the rate of flow of tuples out of stream operator SO5. The services SVC4 and SVC5 may be modified to determine the second and third flow rates (R4, R5). The first performance metric (R6) that service SVC6 generates may be determined from the predictor formula R6=R4+R5. In various embodiments, a predictor formula may be determined by the ANZ 348.

As a second example, the predictor formula may be R6=F4+F5, where F4 is the rate of flow of tuples into SO4 at L4 and F5 is the rate of flow of tuples into SO5 at L5. This second example uses services SVC4 and SVC5 to determine the flow rates F4 and F5. Note this example does not require that the stream operators SO4 and SO5 not modify tuples. It only requires that they do not drop tuples or generate more than one tuple for each tuple received. The determination of movability of the service includes determining that SO4 and SO5 satisfy this requirement.

As a third example, the predictor formula may be R6=R3, where R3 is the rate of flow of tuples out of the stream operator SO3 at L6. The stream operator SO3 includes a split operation. The stream operator SO3 includes first and second output ports. Some tuples output from SO3 are output from the first port coupled to an input of SO4. The remaining tuples output from SO3 are output from a second port to an input of SO5. This third example uses service SVC3 to determine the flow rate R3. This third example assumes that the rate of flow into the stream operators SO4 and SO5 is the same as the rate of flow out of the respective operators. The determination of movability of the service includes determining that SO4 and SO5 satisfy this requirement. This example does not require that the stream operators SO4 and SO5 not modify tuples.

As a fourth example, the predictor formula may be R6=2× R4, where R4 is the rate of flow of tuples out of SO4. As mentioned, the stream operator SO3 includes a split operation and includes first and second output ports. In this example, the split operation at stream operator SO3 outputs one half of the tuples on the first port and the other half of the tuples on the second output port. This fourth example assumes that the rate of flow into the stream operators SO4 and SO5 is the same as the rate of flow out of the respective operators. The determination of movability of the service includes determining that stream operator SO3 outputs one half of the tuples on the first port and the other half of the tuples on the second output port, as well as determining that SO4 and SO5 satisfy the requirement that the input flows match the output flows. This example does not require that the stream operators SO4 and SO5 not modify tuples.

As a fifth example, the predictor formula may be R6=F3, where F3 is the rate of flow of tuples into SO3 at L7. The rate of flow of tuples F3 received at SO3 may be determined at location L7 by service SVC3. The fifth example assumes that the rates of flow into the stream operators SO3, SO4, and SO5 are the same as the rate of flow out of the respective operators. The determination of movability of the service includes determining that SO3, SO4, and SO5 satisfy this requirement. This example does not require that the stream operators SO3, SO4, and SO5 not modify tuples.

In a sixth example, the predictor formula may be R6=R1+ R2, where R1 is the rate of flow out of stream operator SO1 and R2 is the rate of flow out of stream operator SO2. The rates of flow of tuples R1 and R2 may be determined by services SVC1 and SVC2, respectively. Stream operator SO3 includes a union operation. Stream operator SO3 joins a first stream received from SO1 and a second stream received from SO2. The sixth example assumes that the rates of flow into the stream operators SO3, SO4, and SO5 are the same as the rate of flow out of the respective operators. The determination of movability of the service includes determining that SO3, SO4, and SO5 satisfy this requirement. This example does not require that the stream operators SO3, SO4, and SO5 not modify tuples.

Figure 9:
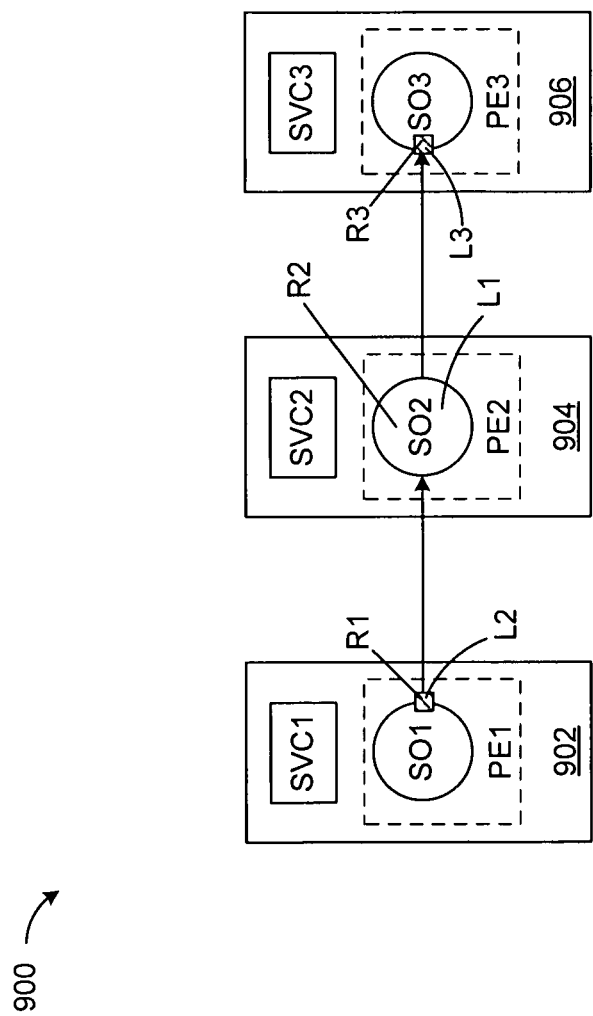
FIG. 9 illustrates an example of an operator graph having a first location where a first performance metric is measured, and two or more locations where performance can be measured to predict the first performance metric according to various embodiments.

FIG. 9 is an example of a portion of an operator graph for a stream-based computing application. The operator graph portion 900 shown in FIG. 9 includes stream operators SO1 to SO3, which are included in respective processing elements PE1 to PE3. The processing elements PE1 to PE3 are deployed on respective compute nodes 902 to 906. The compute nodes 902 to 906 each include one or more services (SVC1 to SVC3) running on the respective nodes. While operator graph portion 900 includes stream operators designated SO1 to SO3, these stream operators SO1 to SO3 may be configured to perform the same or different operations as like designated stream operators in other figures.

FIG. 9 illustrates an example of an operator graph having a first location L1 where a first performance parameter is measured and compared with a first performance metric, and two or more locations where second and third performance parameters can be measured, i.e., a second and third parameters are measurable, and evaluated with a predictor formula to achieve a same or similar objective as comparing the first performance parameter with the first performance metric according to various embodiments. In various embodiments, it may be determined that an overhead parameter associated with the streams service SVC2 at L1 in FIG. 9 is outside, e.g., exceeds, an overhead metric or criterion. In addition, it may be determined whether the streams service SVC2 is movable to one or more other locations in the operator graph. This determination of movability of the service SVC2 may include determining a predictor formula for evaluating values measured at other locations. In various embodiments, a predictor formula may be determined by the ANZ 348. As an example, service SVC2 measures a first parameter for comparison with a first performance metric at stream operator SO2. The first parameter may be processing speed or time R2 at SO2 and the first performance metric may be an ideal or expected processing speed or time. The predictor formula may be based on a second performance parameter, e.g., a first rate at which tuples are received from SO2 at one or more other stream operators, and a third performance parameter, e.g., a second rate at which tuples are input to SO2 from one or more other stream operators. In addition, the predictor formula may predict a substitute metric or expression that achieves the same or similar goal as comparing the first performance parameter with the first performance metric. One example of a predictor formula is based on a first rate R3 at which tuples are received at SO3 and a second rate R1 at which tuples are output from SO1. The service SCV2 may be duplicated, modified, and moved to SVC1 and SVC3 to determine the first and second rates R1 and R3. The predictor formula may include two components. First, the predictor formula may determine whether R1=R3. If R1=R3, the predictor formula infers that a tuple processing rate R2 (at PE2) is at least as great as the tuple output rate R1 (R2≥R1). In addition, the predictor formula may determine whether R1>R3. If R1>R3, the predictor formula infers that a tuple processing rate R2 is equal to R3 (R2=R3). While the predictor formula does not determine the tuple processing rate R2 for all conditions, it does determine that R2 is either greater than or equal to a known value (R1) or is equal to a known value (R3). This information about the tuple processing rate R2 may be compared with the first performance metric to achieve the same or similar objective as comparing the first performance parameter with the first performance metric, and may provide sufficient information for particular monitoring purposes. The services SVC1 and SVC3 together provide data needed to compare substitute information regarding processing speed or time with the first performance metric at SO2, enabling the service SVC2 to be stopped. One or both of the services SVC1 and SVC3 may include and evaluate the predictor formula.

Figure 10:
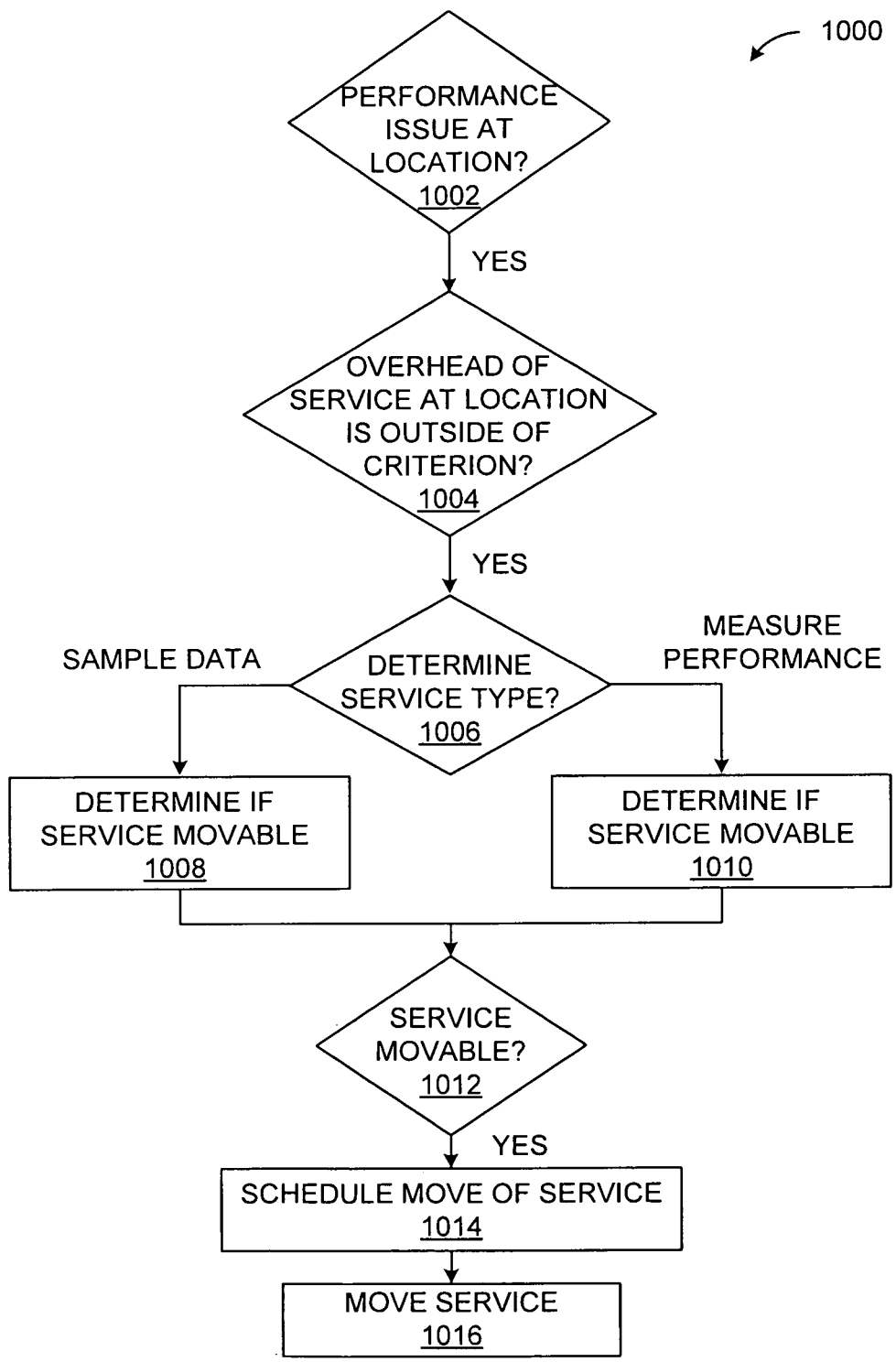
FIG. 10 is a flow diagram of a process for moving a service from a first location to a second location, the process including first and second sub-processes for determining whether a service is movable according to various embodiments.

FIG. 10 is a flow diagram of a process 1000 for moving a service from a first location to a second location, the process including first and second sub-processes for determining whether a service is movable according to various embodiments. Various performance objectives may be established for an operator graph, e.g., processing speed, throughput, etc. One or more performance metrics may be used to determine whether the performance objectives are being met for the operator graph. In order to determine whether the operator graph as a whole is achieving performance objectives, performance metrics may be determined at a plurality of locations. In operation 1002, it is determined whether a performance parameter at a first location (e.g., a stream operator, processing element, or compute node) is outside of a first performance metric or criterion.

If the performance parameter at a first stream operator is outside of a first performance metric or criterion, the process moves to operation 1004. In operation 1004, it is determined whether an overhead parameter associated with a first streams service located at the first location (e.g., a stream operator, processing element, or compute node) is outside of a first overhead metric or criterion. A service may have a small or large impact on the performance of at the first location. Operation 1004 is one example of analyzing each service and determining what impact the service has at a location. If it is determined that an overhead parameter associated with a first streams service located at a first location is outside of a first overhead criterion, it may be inferred that the first streams service is contributing to the performance metric not being met at the first location and the process moves to operation 1006.

In operation 1006, services may categorized by whether the service samples data at a location or measures performance without analyzing samples of data, i.e., attributes of tuples. It should be understood that that a service that samples data may analyze the sampled data to measure performance in some embodiments. In operation 1006, it may be determined whether or not the service samples attributes of tuples. The result of the determination in operation 1006 is used to determine whether the service is movable in operations 1008 and 1010, which are described below with respect to FIGS. 11 and 12. In operation 1012, it is determined whether the service is movable based on the results of operations 1008 and 1010.

If a service is determined to be movable, movement of the service may be scheduled in operation 1014. The MOV SCH 352 may perform the operation 1014. For example, the MOV SCH 352 may schedule the move of the service to its new location or locations. The MOV SCH 352 can use different factors in determining how and when to move the service. For example, a service that collects parameter values for every 100 tuples may be scheduled to move after it reaches the next iteration of 100 tuples. As another example, the scheduler may start a new service and have the new service running downstream (or upstream) prior to stopping the original service in order to provide complete coverage throughout a transitional period. In operation 1016, the original service is moved to a new location by ending the original service and adding the new service at the new location. In embodiments in which the original service is split, the original service may be moved to two or more new locations in operation 1016. In embodiments in which the original service provided at two or more locations is merged, the original service may be moved to fewer new locations, e.g., one new location, in operation 1016.

Figure 11:
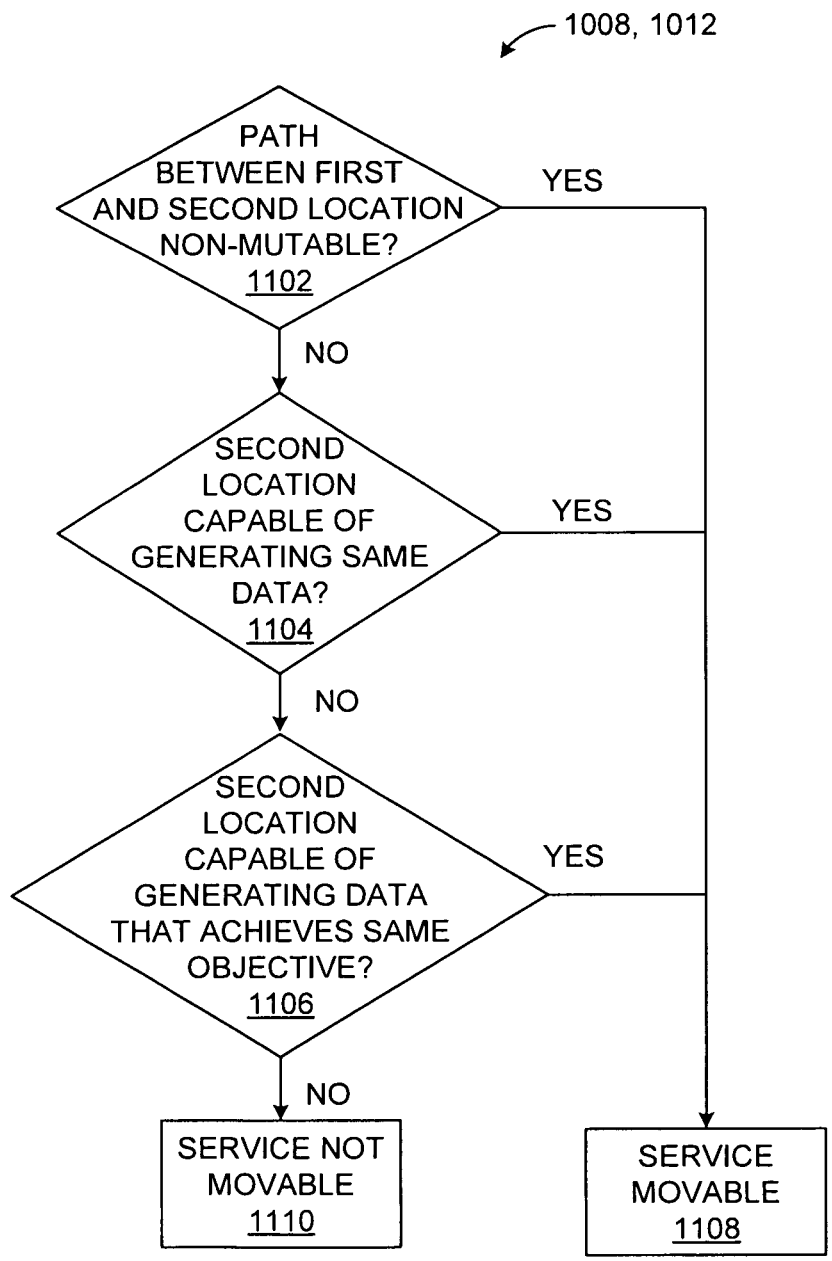
FIG. 11 is a flow diagram of a first sub-process for determining whether a service is movable according to various embodiments.

FIG. 11 is a flow diagram of a first sub-process 1008, 1012 for determining whether a service is movable according to various embodiments. The first sub-process may be used for a service that samples one or more attributes of tuples at a location, e.g., samples data from a stream. In operation 1102, it may be determined whether a path between a first location where a service samples an attribute of tuples and a second location in the operator graph where the service might be moved is non-mutable. A non-mutable path is a path that does not modify the sampled attribute of the tuple. FIGS. 4 and 5 provide examples of non-mutable paths in an operator graph. If the path is non-mutable, the service is determined to be movable (operation 1108). If the path is mutable, the process moves to operation 1104.

In operation 1104, it is determined whether there is a second location in the operator graph capable of generating the same data that the service samples at a first location. The first example given with respect to FIG. 7 (a service at new location is modified to convert samples of an attribute t from Celsius to Fahrenheit) provides an example of a second location in an operator graph capable of generating the same data that the service samples at a first location. If there is a second location in the operator graph capable of generating the same data, the service is determined to be movable (operation 1108). If not, the process moves to operation 1106.

In operation 1106, it is determined whether there is a second location capable of generating data that achieves the same objective that is achieved by a service at a first location. The second example given with respect to FIG. 7 (a service at a new location is modified to determine whether samples of the attribute fall within a modified range of values) provides an example of a second location in an operator graph capable of generating data that achieves the same objective that is achieved by a service at a first location. If there is a second location in the operator graph capable of generating data that achieves the same objective, the service is determined to be movable (operation 1108). If not, the process moves to operation 1110 where the service is determined to be not movable.

Figure 12:
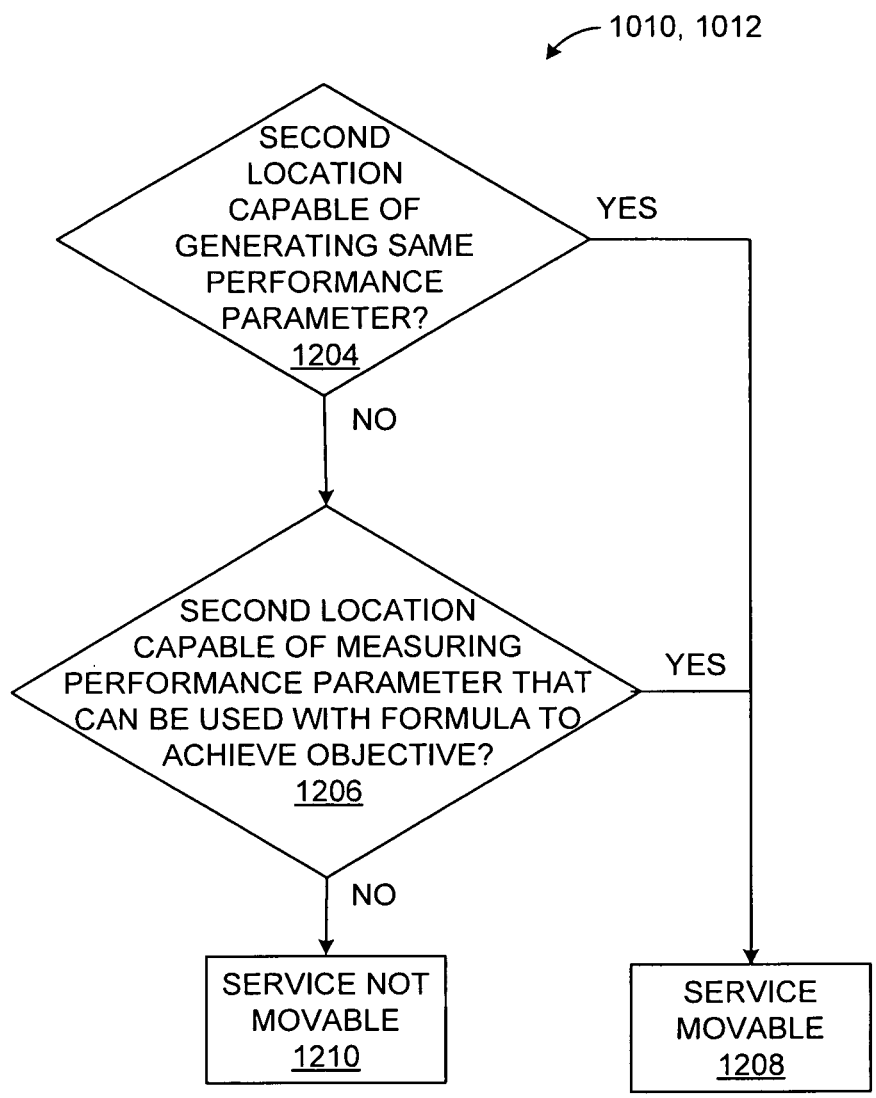
FIG. 12 is a flow diagram of a second sub-process for determining whether a service is movable according to various embodiments according to various embodiments.

FIG. 12 is a flow diagram of a second sub-process 1010, 1012 for determining whether a service is movable according to various embodiments. The second sub-process may be used for a service that measures performance without analyzing samples of data. In operation 1204, it is determined whether there are one or more second locations capable of generating the same performance parameter that the service determines at a first location. Examples given with respect to FIG. 8 (a first rate of flow of tuples is measured a first location L1 and various second locations are shown where a second rate of flow of tuples can be measured and the second rate is the same as the first rate) provide examples of operation 1204. If there is a second location capable of generating the same performance parameter that the service determines at a first location, the service is determined to be movable. The process moves to operation 1208. Otherwise, the process moves to operation 1206.

In operation 1206, it is determined whether there is a second location where a performance parameter can be measured and evaluated using a predictor formula to achieve the same or similar objective as comparing a performance parameter measured at a first location with a first performance metric. In various alternatives, operation 1206 may determine whether there are two or more locations where performance parameters can be measured and evaluated using a predictor formula to achieve the same or similar objective as comparing a performance parameter measured at a first location with a first performance metric. The operation 1206 may include determining a predictor formula. In addition, the predictor formula may provide substitute information and the operation 1206 may include comparing this substitute information with the first performance metric. The example given with respect to FIG. 9 (a first performance parameter at a first location is a processing speed; second and third performance parameters are rates of tuple flow at second and third locations, which may be used to achieve an objective of determining performance of a stream operator at the first location using the substitute information provided by the predictor formula) provides an example of the operation 1206. If there are second and third locations capable of measuring performance parameters that provide substitute information that can be used to achieve the same or similar objective as comparing a performance parameter measured at a first location with a first performance metric, it is determined that the service is movable and the process 1010, 1012 moves to operation 1208. Otherwise, the process moves to operation 1210 where it is determined that the service is not moveable.

In the foregoing, reference is made to various embodiments. It should be understood, however, that this disclosure is not limited to the specifically described embodiments. Instead, any combination of the described features and elements, whether related to different embodiments or not, is contemplated to implement and practice this disclosure. Furthermore, although embodiments of this disclosure may achieve advantages over other possible solutions or over the prior art, whether or not a particular advantage is achieved by a given embodiment is not limiting of this disclosure. Thus, the described aspects, features, embodiments, and advantages are merely illustrative and are not considered elements or limitations of the appended claims except where explicitly recited in a claim(s).

Aspects of the present disclosure may be embodied as a system, method, or computer program product. Accordingly, aspects of the present disclosure may take the form of an entirely hardware embodiment, an entirely software embodiment (including firmware, resident software, micro-code, etc.), or an embodiment combining software and hardware aspects that may all generally be referred to herein as a "circuit," "module," or "system." Furthermore, the computer program product may include a computer readable storage medium (or media) having computer readable program instructions thereon for causing a processor to carry out aspects of the various embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of embodiments of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, conventional procedural programming languages, such as the "C" programming language or similar programming languages, and a streams programming language, such as IBM Streams Processing Language (SPL). The program code may execute as specifically described herein. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of embodiments of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although embodiments are described within the context of a stream computing application, this is not the only context relevant to the present disclosure. Instead, such a description is without limitation and is for illustrative purposes only. Additional embodiments may be configured to operate with any computer system or application capable of performing the functions described herein. For example, embodiments may be configured to operate in a clustered environment with a standard database processing application. A multi-nodal environment may operate in a manner that effectively processes a stream of tuples. For example, some embodiments may include a large database system, and a query of the database system may return results in a manner similar to a stream of data.

While the foregoing is directed to exemplary embodiments, other and further embodiments of the disclosure may be devised without departing from the basic scope thereof, and the scope thereof is determined by the claims that follow.

What is claimed is:

1. A computer program product for processing a stream of tuples, the computer program product comprising a computer readable storage medium having program code embodied therewith, the program code comprising computer readable program code configured to:
   receiving a stream of tuples to be processed by a plurality processing elements executing on two or more compute nodes, each compute node having one or more processors and a memory to store one or more of the processing elements, each processing element including one or more stream operators, wherein each stream operator is connected to at least one other stream operator and the stream operators define an operator graph having one or more execution paths corresponding with one or more flows of tuples between the stream operators;
   determining whether an overhead parameter associated with a first streams service located at a first stream operator is outside of a first overhead criterion; and
   ending the first streams service at the first stream operator, and
   instantiating a second streams service at a second stream operator in the operator graph when the overhead parameter associated with the first streams service is outside of the first overhead criterion, wherein the second stream operator is different from the first stream operator.

2. The computer program product of claim 1, further comprising:
   determining that the first streams service samples a first data attribute of tuples; and
   determining whether the first streams service is movable.

3. The computer program product of claim 2, wherein the determining whether the first streams service is movable further comprises: determining that a first execution path between the first and second stream operators does not modify the first data attribute of tuples flowing on the first execution path.

4. The computer program product of claim 2, wherein the determining whether the first streams service is movable further comprises: determining that the first streams service generates a first result by performing a first operation with respect to tuples at the first stream operator, and determining that a second operation is performable at the second stream operator to generate the first result.

5. The computer program product of claim 4, wherein the first operation determines whether a first attribute of tuples at the first stream operator is within a first range and the second operation determines whether the first attribute of tuples at the second stream operator is within a second range.

6. A system for processing a stream of tuples, comprising:
   two or more compute nodes, each compute node having one or more processors and a memory to store one or more of processing elements, each processing element including one or more of a plurality of stream operators, wherein each stream operator is connected to at least one other stream operator and the stream operators define an operator graph having one or more execution paths corresponding with one or more flows of tuples between the stream operators;

a monitoring component to determine whether an overhead parameter associated with a first streams service located at a first stream operator is outside of a first overhead criterion; and a move scheduling component to:
  end the first streams service at the first stream operator, and
  instantiate a second streams service at a second stream operator in the operator graph when the overhead parameter associated with the first streams service is outside of the first overhead criterion, wherein the second stream operator is different from the first stream operator.

7. The system of claim 6, further comprising an analyzing component to determine that the first streams service measures performance and to determine whether the first streams service is movable, wherein the determining of whether the first streams service is movable includes: determining a predictor formula for determining a first performance parameter measurable at the first stream operator, the predictor formula being based on a second performance parameter measurable at the second stream operator.

8. The system of claim 7, wherein the first performance parameter is a first rate of flow of tuples at the first stream operator and the second performance parameter is a second rate of flow of tuples at the second stream operator.

9. The system of claim 6, further comprising an analyzing component to determine that the first streams service measures performance and to determine whether the first streams service is movable, wherein the determining whether the first streams service is movable includes: determining a predictor formula for determining information about a first performance parameter measurable at the first stream operator, wherein the predictor formula is based on a second performance parameter measurable at the second stream operator and a third performance parameter measurable at a third stream operator.

* * * * *